(No Model.)　　　　　　　W. P. BARCLAY.　　　　2 Sheets—Sheet 2.
ABRADING TOOL.

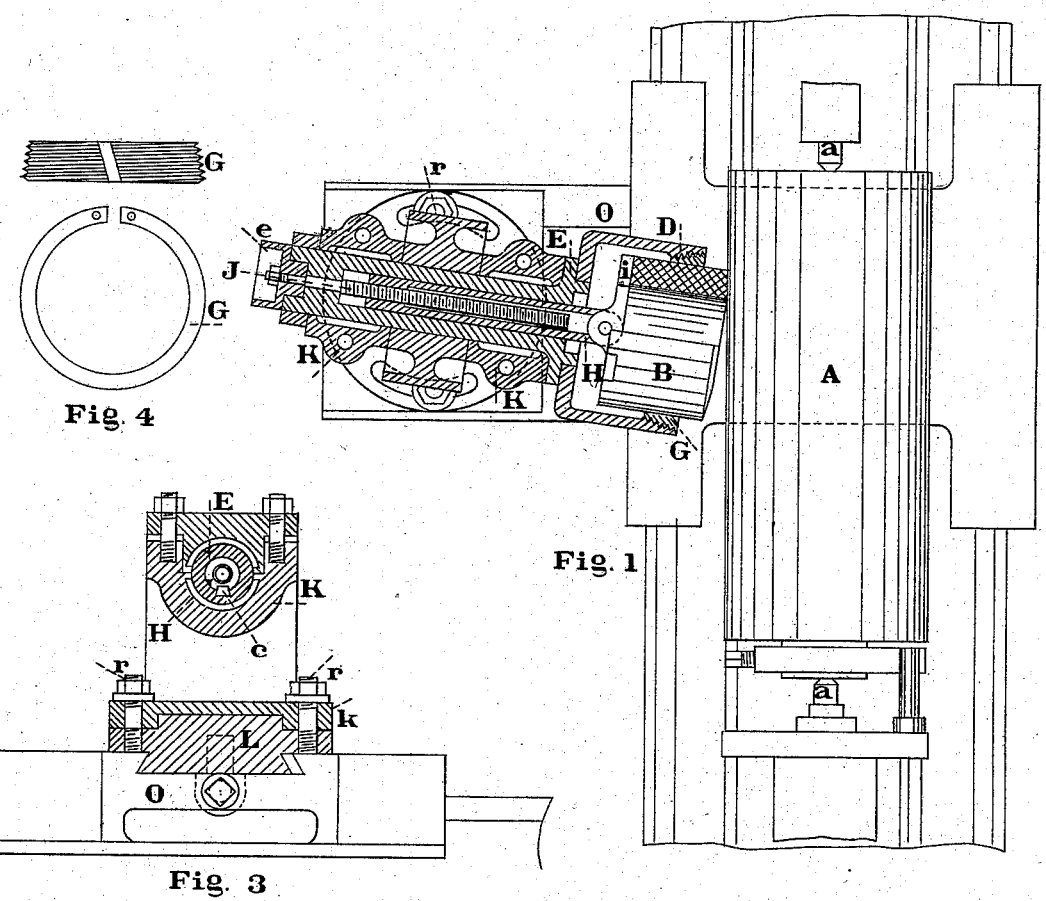

No. 293,398.　　　　　　　　　　　Patented Feb. 12, 1884.

WITNESSES:
F. S. Johnson
Jno. H. Cowper

INVENTOR
W. P. Barclay

ATTORNEY

UNITED STATES PATENT OFFICE.

WILLIAM PARIS BARCLAY, OF CHICAGO, ILLINOIS.

ABRADING-TOOL.

SPECIFICATION forming part of Letters Patent No. 293,398, dated February 12, 1884.

Application filed June 4, 1883. (No model.)

*To all whom it may concern:*

Be it known that I, W. P. BARCLAY, a citizen of the United States, residing at Chicago, in the county of Cook and State of Illinois, have invented certain new and useful Improvements in Abrading-Tools, of which the following is a specification.

My invention relates to improvements in the construction and mounting of tubular abraders; and the object of my invention is to so strengthen and suspend an abrading-tube that the same, when rotating at a high velocity, is perfectly safe and easily manipulated.

Figure 10:
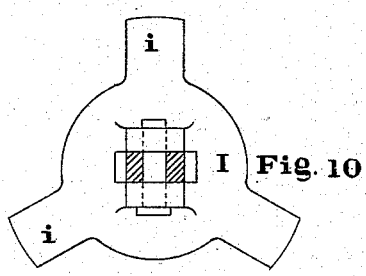
Figure 11:
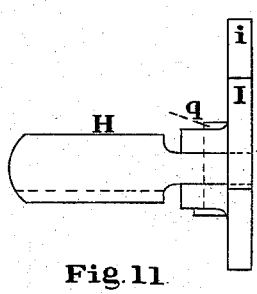

Referring to the drawings, in which similar letters indicate corresponding parts, Figure 1 is a plan view of my improved tubular grinding apparatus. Fig. 2 is a side elevation of the same, and Fig. 3 is a transverse elevation. Fig. 4 shows two different views of the nut G. Figs. 5, 6, 7, 8, and 9 are different views of my improved abrading-tube. Figs. 10 and 11 are different views of the abrading-tube thrust-plate.

The metal cylinder A is represented as pivoted from the conical-shaped centers $a$. The said centers can be supported from tail and head stocks, as in an ordinary lathe, and the cylinder A given a revolving motion. An abrading-tube, B, is shown in Figs. 1 and 2 projecting from the hollow cylinder D, the said cylinder being firmly attached to one end of the spindle E. The belt-pulley F is also attached to the spindle E, and communicates motion to the spindle E, cylinder D, spindle H, and abrading-tube B. The end of cylinder D, from which the abrading-tube B projects, has a thread formed for a short distance upon its inner periphery. The said thread is given a slight taper, and fitting into the tapered thread is a nut, G, with a corresponding thread formed upon its outer periphery. The said nut is cut clear through on one side, leaving the two ends of nut separated a short distance; and as the nut G is screwed into the cylinder D, the ends of said nut gradually come closer together, reducing the diameter of nut G, and causing the said nut to clamp or hold firmly the abrading-tube B at any position it is adjusted to.

The spindle E is hollow, and has a spindle, H, fitting into it. The spindle H is connected to the thrust-plate I. The said thrust-plate has three short arms, $i$, and one end of abrading-tube B has three recesses, $b$, to correspond to the size and shape of the arms $i$. The spindle H and thrust-plate I are preferred to be made with a joint, as shown, as the arms $i$ can then accommodate themselves to a bearing in the recesses $b$ of the abrading-tube B.

The spindle H is prevented from turning around in the bore of spindle E by a feather, $c$, that is dovetailed into the spindle E, the spindle H having a recess, $h$, its entire length for the said feather to slide in. Working into the spindle H is a thrust-screw, J. The said thrust-screw is connected to the spindle E, and is held in position by the collar $e$. The spindle E is supported by two pillows, K. The base $k$ of pillows is common to each, and is secured to the slide-plate L by the bolts $r$, oblong bolt-holes being formed in the base $k$, so that it can be turned around a sufficient distance that the abrading-tube B can be placed at an angle to the cylinder A.

The abrading-tube B, as it wears away, can be forced outward from the cylinder D, the thrust-screw J forcing the spindle H, thrust-plate I, and the abrading-tube B outward. When the collar $e$, which is firmly attached to the screw J, is caused to revolve in the proper direction, or when the abrading-tube B is in operation, to prevent the collar $e$ from revolving for an instant would in effect serve the same purpose. The abrading-tube B requires to be rotated in a reverse direction always from that in which the thread formed on screw J is cut; otherwise it would affect the spindle H and abrading-tube B, so that they would move in instead of out, when the said collar $e$ was prevented, for an instant, from revolving with the spindle E.

The thrust-plate I is joined to the spindle H by a bolt, $q$, and the spindle H being prevented from turning in the bore of spindle E by the feather $c$, and the arms $i$ of the thrust-plate I fitting into the recesses $b$ of the abrading-tube B, whenever a revolving motion is communicated to the spindle E, the abrading-tube B is also forced to revolve in the same direction, the nut G acting as a clamp to prevent the abrading-tube B from trembling when revolving at a high speed.

The base of pillows K is secured to the slide-plate L by the bolts r. The said slide-plate is fitted to the lathe-carriage O, and the slide-plate can be used as the abrading-tube wears away to feed the same up to the cylinder A whenever the operator causes the screw S to turn in the requisite direction.

Figure 8:
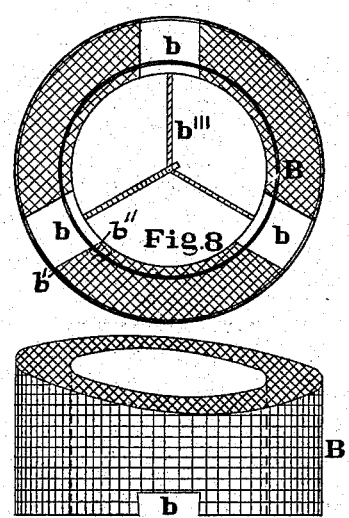
Figure 5:
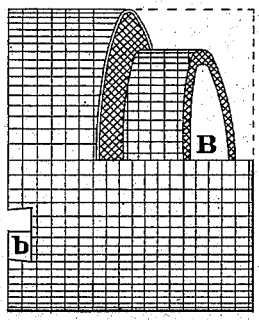
Figure 6:
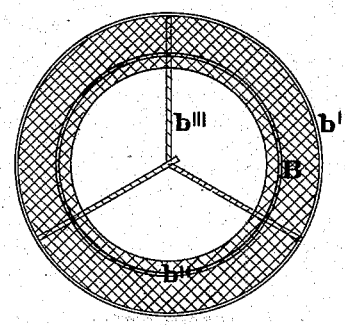
Figure 7:
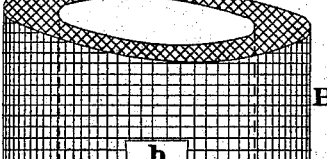
Figure 9:
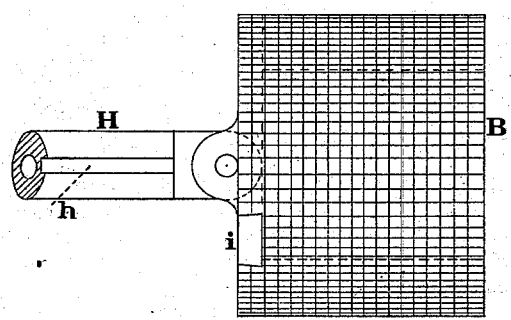

The abrading-tube B is shown in Figs. 5, 6, 7, 8, and 9 to an increased scale, and is strengthened by wire-gauze tubes $b'$ and $b''$. One end of abrading-tube B has three recesses, $b$, formed in it. The arms $i$ of thrust-plate I fit into the said recesses, and as the spindle H and thrust-plate I revolve, the abrading-tube B is forced to revolve with them. In the two end elevations of abrading-tube B, Figs. 6 and 8, are shown radial arms $b'''$. The said arms connect with the wire-gauze tubes $b'$ and $b''$, and are hooked to the same, each alternate radial wire of the wire-gauze arms $b'''$ being secured to different tubes. The central ends of arms $b'''$ also hook one to another.

To those familiar with the use of the ordinary solid emery, corundum, or other composite abrading-wheel, it is well known to be nearly an impossibility to produce such wheels, the crystals of which are cemented together, that the adhesiveness of the crystals one to another is, when under the most severe rotating tests of such wheels, always equal to resist the centrifugal strain placed upon them; and just so soon as the tangential strain that is developed in the wheel, by it rotating at a high velocity, becomes greater than the adhesiveness the crystals composing the abrading-wheel have one to another, it bursts and flies off, doing more or less injury to machinery or persons in proximity.

An abrading-tube surrounded by a wire-gauze tube evades the evils of the ordinary solid-shaped abrading-wheel, and the abrading-tube can be used to advantage for grinding a large variety of different articles. There also can be embedded in the body of the abrading-tube one or more wire-gauze tubes, the embedded wire-gauze tubes being inserted into their positions when the abrading-tube is in a plastic condition. The outer wire-gauze tube may be expanded by heat and shrunk onto the abrading-tube after it is molded and thoroughly hard. A tube of sheet-iron or other metal perforated with holes is equally suitable for strengthening the abrading-tube as a tube or cylinder made from wire-gauze, and can be advantageously used for such purpose.

In molding the abrading-tubes according to my present invention, the same process that is required to produce an ordinary solid abrading-wheel is gone through.

Having described my invention, I claim—

1. An abrading-tube, B, surrounded by a cylindrical wire-gauze tube, $b'$, or thin sheet-metal tube perforated with holes, the said metal tube being of a material capable of being worn away with the particles composing the body of the abrading-tube when the same is rotated, substantially as described and shown.

2. An abrading-tube, B, having one or more concentric wire-gauze tubes, $b''$, embedded in the body of the abrading-tube B, the said tubes also having radial arms $b'''$, that assist to strengthen the abrading-tube, substantially as shown and described.

3. An abrading-tube, B, with one or more recesses, $b$, at one end, in combination with thrust-plate I, spindle H, thrust-screw J, spindle E, collar $e$, and hollow cylinder D, substantially as shown and described.

4. The double pillow K and slide-plate L, in combination with spindle E, pulley F, cylinder D, nut G, and abrading-tube B, substantially as shown and described.

WILLIAM PARIS BARCLAY.

Witnesses:
JNO. BUCKLEY,
F. S. JOHNSON.